May 19, 1942.  P. C. TEMPLE  2,283,296
VALVE MECHANISM
Filed Jan. 12, 1939  4 Sheets-Sheet 1

Inventor
PAUL C. TEMPLE
By Albert G. Blodgett
Attorney

May 19, 1942.  P. C. TEMPLE  2,283,296
VALVE MECHANISM
Filed Jan. 12, 1939   4 Sheets-Sheet 3

Inventor
PAUL C. TEMPLE

By Albert G. Blodgett
Attorney

Inventor
PAUL C. TEMPLE

Patented May 19, 1942

2,283,296

UNITED STATES PATENT OFFICE 2,283,296

VALVE MECHANISM

Paul C. Temple, Decatur, Ill., assignor to A. W. Cash Company, Decatur, Ill., a corporation of Delaware Application January 12, 1939, Serial No. 250,590

8 Claims. (Cl. 137—153)

This invention relates to valve mechanisms, and more particularly to valve mechanisms of the type adapted to respond to variations in the pressure of a primary fluid and to vary the pressure of an auxiliary fluid accordingly for control purposes.

Valve mechanisms of this type are commonly known as pilot controllers and they are frequently used in connection with diaphragm motor valves having a valve member actuated by a fluid-pressure responsive diaphragm. Such pilot controllers ordinarily include a device responsive to variations in the primary fluid pressure, and a pilot valve actuated by this device and arranged to control the auxiliary fluid pressure. In some cases the pressure responsive device has been connected to a pointer arranged to move over a scale or dial and thereby indicate the pressure of the primary fluid. It has also been proposed to provide a second pointer which can be set in advance to a position corresponding to the desired pressure, the pilot valve being actuated when the two pointers indicate the same pressure. With certain of these prior constructions however the pilot valve has required considerable force for its operation, and this has created such a load on the pressure-responsive device as to prevent an accurate and reliable pressure indication by the pointer connected therewith. In some cases the pilot valve construction is such as to absolutely block movement of the pressure-responsive device beyond a predetermined extent. Other prior constructions have utilized pilot valves which are incapable of closing tightly when required. Still other constructions have been complicated, expensive and subject to frequent repair and adjustment.

It is accordingly one object of the invention to provide a valve mechanism which will vary the pressure of an auxiliary fluid in accordance with variations in the pressure of a primary fluid, while affording at all times an accurate indication of the primary fluid pressure.

It is a further object of the invention to provide a valve mechanism having a fluid-pressure responsive device arranged to actuate a pilot valve, the pilot valve being so constructed as to allow over-travel of said device without imposing an appreciable load thereon.

It is a further object of the invention to provide a valve mechanism having a pilot valve which will close tightly when required and yet can be opened by only a negligible force.

It is a further object of the invention to provide a valve mechanism which can be adjusted for a predetermined fluid pressure and which will afford an accurate indication of the pressure which actually exists at any given time.

It is a further object of the invention to provide a valve mechanism of the fluid-pressure actuated type which will be comparatively simple and inexpensive to manufacture and which will operate in a thoroughly reliable manner throughout a long life of service.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a front elevation of my improved valve mechanism in association with other apparatus;

Figure 1:
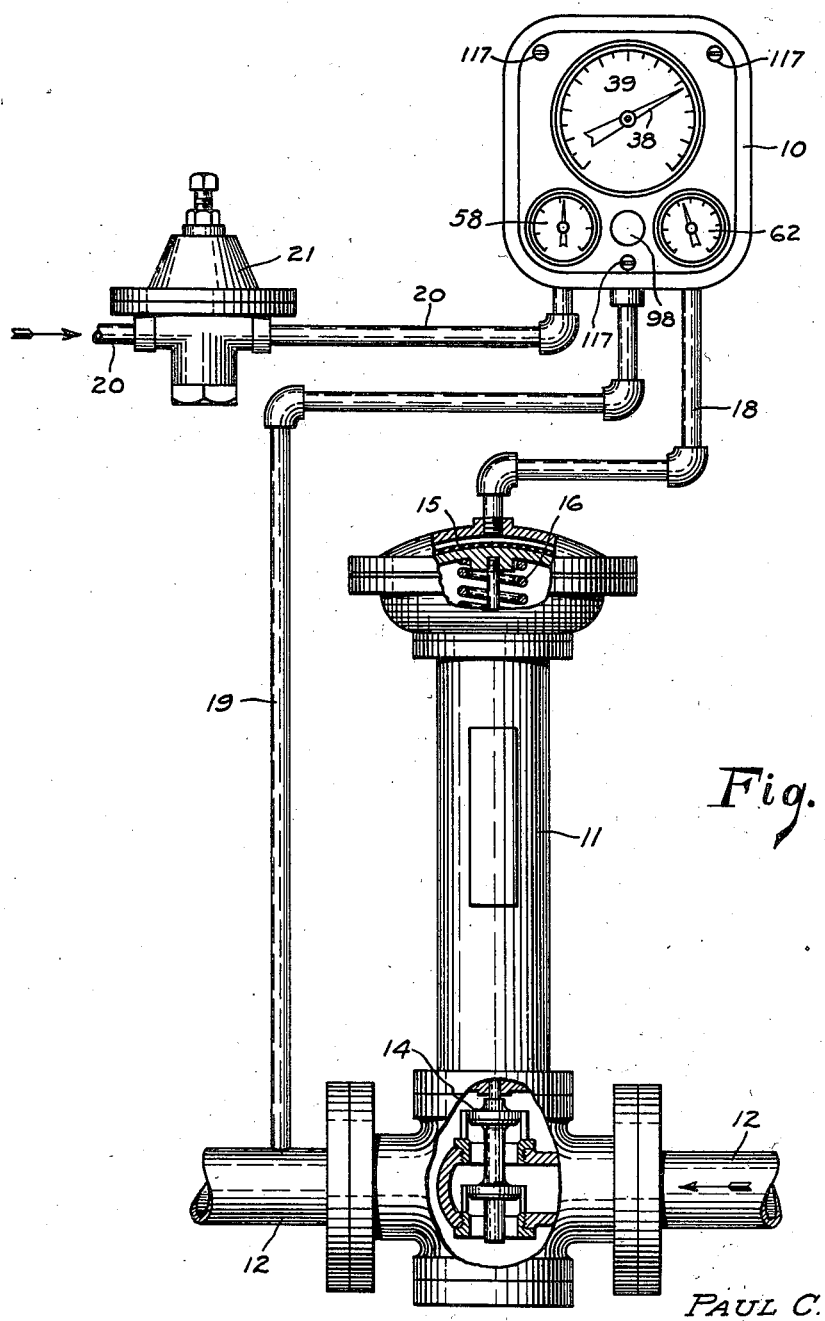

The embodiment illustrated comprises a pilot controller 10 (Fig. 1) arranged to control the operation of a diaphragm motor valve 11 mounted in a pipe line 12 through which fluid flows in the direction of the arrow. The motor valve 11 is of a well-known construction, and includes a slidable valve member 14 which is actuated by a flexible diaphragm 15 loaded by a spring 16. This spring tends to open the valve, and by applying varying degrees of fluid pressure to the diaphragm the valve can be closed to any extent desired, in opposition to the spring. This varying fluid pressure is transmitted to the diaphragm through a pipe 18 leading from the controller 10. The controller is arranged to respond to variations in the fluid pressure at the discharge side of the motor valve 11, and for this purpose a pipe 19 is provided to transmit this pressure from the pipe 12 to the controller. A pipe 20 is arranged to supply fluid, preferably compressed air, from a suitable source (not shown) to the controller, and the pressure at the controller is preferably maintained substantially constant by means of a suitable pressure reducing and regulating valve 21. The controller 10 is so constructed and arranged as to reduce the pressure of the air received through the pipe 20 and to vary the pressure-reduction in accordance with the slightest change in the pressure transmitted through the pipe 19. The reduced air pressure is transmitted through the pipe 18 and controls the motor valve 11, which opens or closes as may be required to restore the desired pressure in the pipe 12 at the delivery side of the motor valve.

Figure 2:
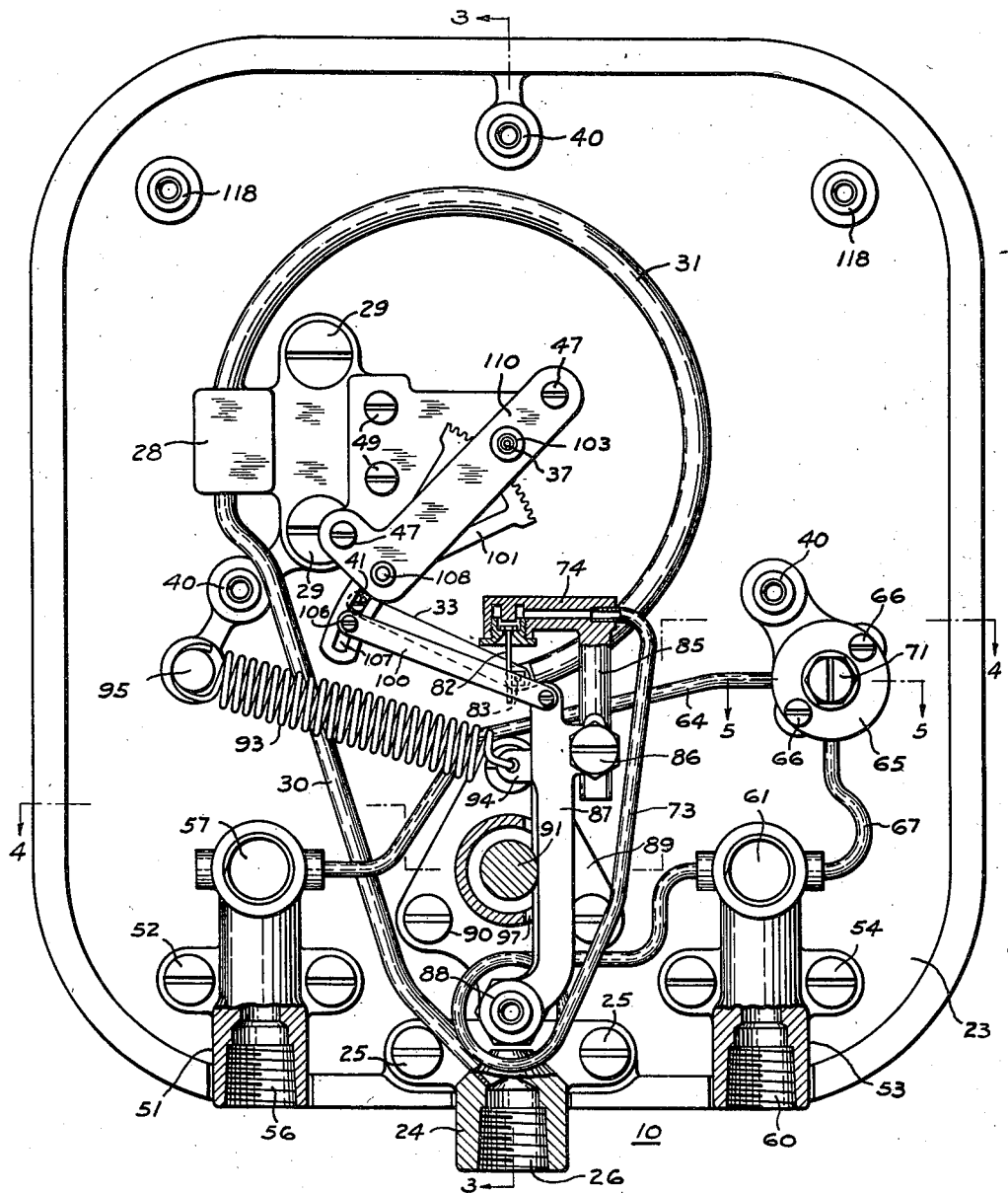
Fig. 2 is a front elevation of the valve mechanism, with certain parts thereof removed and others broken away for clearness of illustration.
Figure 3:
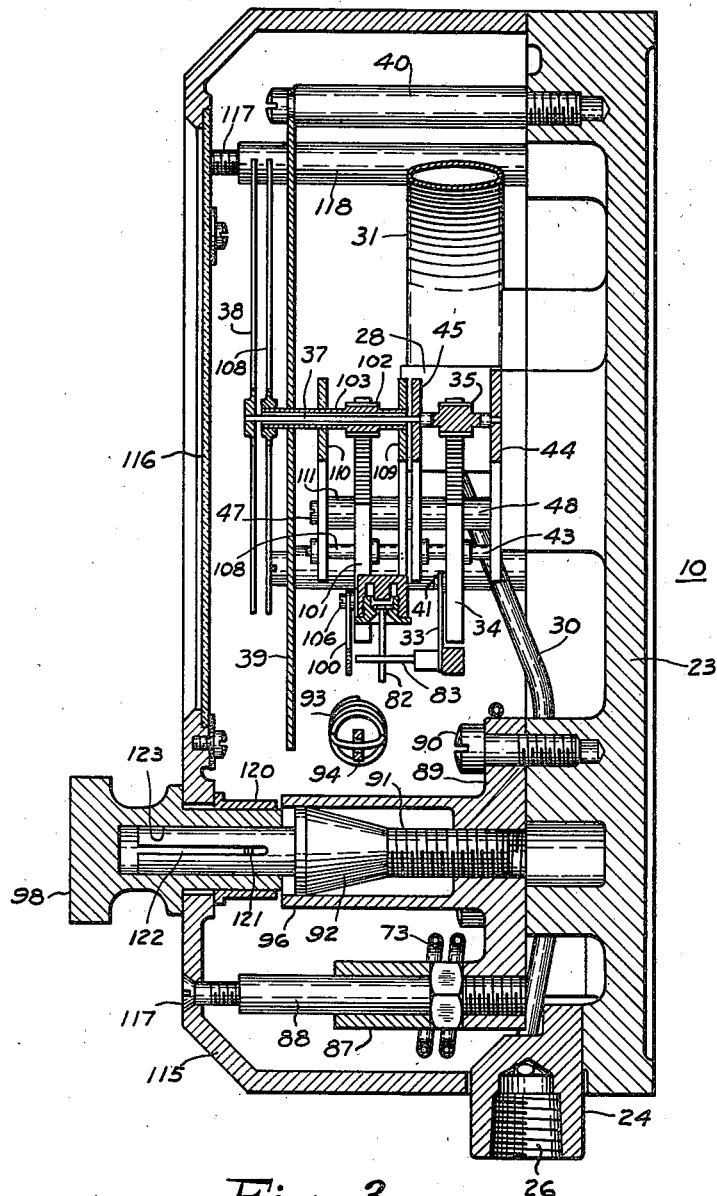
Fig. 3 is a section on the line 3—3 of Fig. 2.
Figure 4:
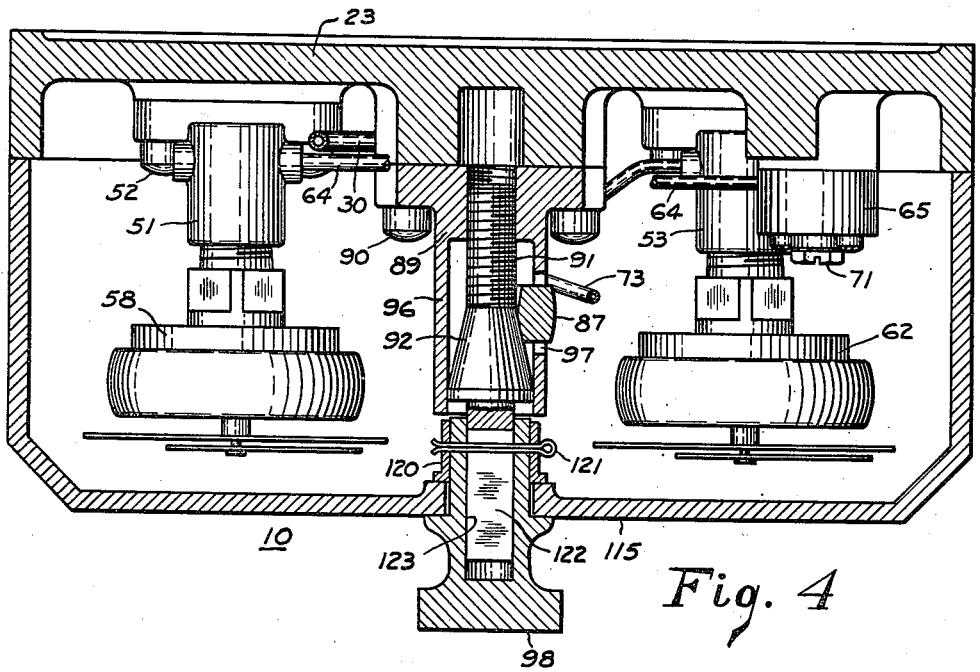
Fig. 4 is a section on the line 4—4 of Fig. 2.

Referring now to Figs. 2, 3 and 4, it will be seen that the controller 10 comprises an upright plate 23 which forms a support for the other parts of the mechanism. This plate is approximately square in front elevation (as shown in Fig. 2), with well-rounded corners. A hollow block 24 is fastened to the front of the plate 23 by means of screws 25, this block being located near the lower edge of the plate at the center thereof. The block 24 is formed at the bottom with a tapped opening 26 to which the pipe 19 of Fig. 1 is connected. A hollow block 28 is fastened to the front of the plate 23 at the upper portion thereof by means of screws 29, and this block is connected to the block 24 by a tube 30. One end of a Bourdon tube 31 of well-known construction is secured to the block 28 in such a way that the fluid pressure in the pipe 19 of Fig. 1 will be transmitted through the block 24, pipe 30 and block 28 to the interior of the Bourdon tube.

Changes in the fluid pressure in the Bourdon tube will cause the free end of the tube to move in a well-known manner, and these movements are utilized to indicate the amount of the pressure. For this purpose the free end of the tube 31 is connected by means of a link 33 to a sector gear 34 (Fig. 3) which meshes with a pinion 35 having a horizontal shaft 37. This shaft extends forwardly from the pinion and carries an indicating hand 38 on its front end. In the rear of the hand 38 is a graduated dial 39 which is supported on the front ends of three horizontal posts 40 extending forwardly from the plate 23. The link 33 is connected to the sector gear 34 by means of a screw 41 which can be adjusted along a slot in the gear in order to obtain a correct pressure indication by the hand 38. In making this adjustment a suitable dead-weight gauge tester will be utilized in a well-known manner. The gear 34 is pivotally supported on a horizontal pin 43 carried by a pair of spaced upright plates 44 and 45, these plates also providing bearings for the shaft 37. The plates 44 and 45 are fastened together by screws 47 and spacer sleeves 48, the inner plate 44 being attached to the block 28 by means of screws 49 (Fig. 2).

Figure 5:
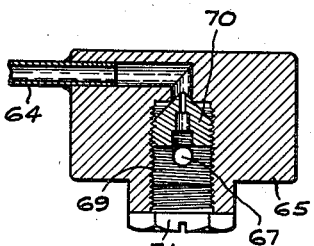
Fig. 5 is an enlarged section on the line 5—5 of Fig. 2.

The compressed air which is supplied to the controller 10 by the pipe 20 of Fig. 1 is reduced in pressure by passing it through an orifice and then through a valve to atmosphere, the valve being controlled by the Bourdon tube 31. The pressure of the air between the orifice and the valve is transmitted through the pipe 18 of Fig. 1 to the motor valve 11. Referring now to Fig. 2, there is provided a hollow fitting 51, which is fastened to the lower left portion of the plate 23 by means of screws 52, and a hollow fitting 53 which is fastened to the lower right portion of the plate 23 by means of screws 54. The fitting 51 is formed at the bottom with a tapped opening 56, to which the pipe 20 is connected, and in the front with a tapped opening 57, to which a suitable pressure gauge 58 (Fig. 4) is connected. The fitting 53 is formed at the bottom with a tapped opening 60, to which the pipe 18 is connected, and in the front with a tapped opening 61, to which a suitable pressure gauge 62 (Fig. 4) is connected. A tube 64 extends from the fitting 51 to a hollow block 65, which is fastened to the plate 23 by means of screws 66, and a tube 67 extends from the block 65 to the fitting 53. As shown in Fig. 5, the block 65 is formed in the front with a tapped opening 69 in which there is mounted an orifice plug 70 so located that the air must pass therethrough on its way from the tube 64 to the tube 67. The front or outer end of the opening 69 is closed by a threaded plug 71.

Figure 6:
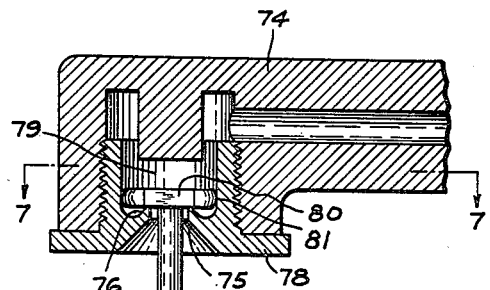
Fig. 6 is an enlarged section through the pilot valve assembly, taken on the line 6—6 of Fig. 7.
Figure 7:
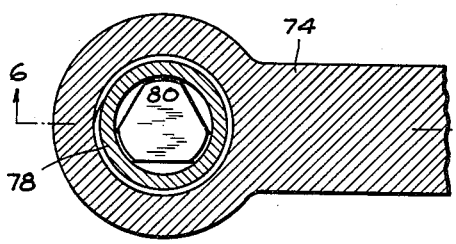
Fig. 7 is a section on the line 7—7 of Fig. 6.
Figure 8:
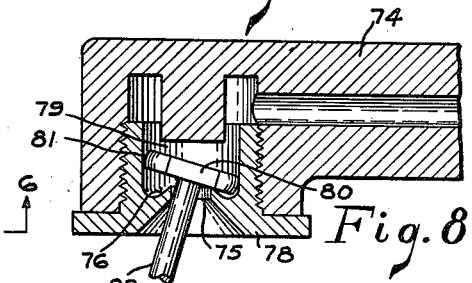
Fig. 8 is a view similar to Fig. 6 but showing the pilot valve in an open position.

The air flows from the tube 67 into the fitting 53 and thence through a tube 73 leading to a hollow valve body or casing 74. As shown particularly in Figs. 6, 7, and 8 this body 74 is provided with an atmospheric discharge port 75 surrounded at its inner or upper end by an annular valve seat 76. Preferably the port 75 and seat 76 are formed in a plug 78 which is screw-threaded into the body 74. Inwardly of the valve seat 76 the plug 78 is provided with a cylindrical recess 79 in which is mounted a valve 80 arranged to cooperate with the seat 76 and thereby control the rate of air flow outwardly through the port 75. This valve 80 is shaped substantially as a circular disk which fits rather closely in the recess 79, the valve being flattened on three sides, as shown in Fig. 7, to allow the air to flow past. The valve is opened by tipping it on the seat 76, as shown in Fig. 8, and in order to permit this movement without binding in the recess 79 the edges 81 of the valve are preferably rounded as shown. The valve 80 is controlled by the Bourdon tube 31, and for this purpose the valve is provided with a long depending central stem 82 somewhat smaller than the port 75 and extending outwardly therethrough. As shown in Figs. 2 and 3, the valve stem 82 lies close to and at one side of an abutment formed by a horizontal pin 83 which extends outwardly from the free end of the Bourdon tube 31. This pin 83 may if desired serve as the pivotal connection between the link 33 and the Bourdon tube. The valve stem 82 may be located at either side of the pin 83, depending upon whether the valve 80 is to be opened upon an increase in the pressure in the Bourdon tube or upon a decrease in this pressure. In the embodiment illustrated the parts are so assembled that a decrease in the pressure will open the valve. The valve is biased toward closed position by its own weight and by the pressure of the air on its upper face, and it is opened by the lateral engagement of the pin 83 with the valve stem 82. Because of the leverage afforded by the long valve stem, the force required to tilt the valve is almost negligible, and so slight as to have no appreciable effect on the accuracy of the pressure indication provided by the hand 38. Furthermore the valve will readily tip to any extent required by the movement of the Bourdon tube.

In order that the controller may be adjusted to maintain any desired fluid pressure, means is provided to vary the position of the valve body 74 relative to the Bourdon tube 31. For this purpose the valve body is formed with a depending portion 85 which is secured by a screw 86 to the upper part of an upright lever 87. The lever 87 is fulcrumed at its lower end on a horizontal pin or post 88 which projects forwardly from a bracket 89, this bracket being fastened to the plate 23 by means of screws 90. The tube 73 makes two turns around the pin 88 in order to increase the flexibility of the tube and permit the lever 87 to move about its fulcrum freely without overstressing the tube. The bracket 89 is tapped to receive the screw-threaded inner end portion of a horizontal pin 91 which is formed with a tapered or conical portion 92 arranged to contact with one side of the lever 87. This contact is maintained by means of a coiled tension spring 93 (Fig. 2) which connects a lug 94 on the upper end of the lever 87 with a pin 95 projecting forwardly from the plate 23. The pin 91 is supported laterally by means of a hollow cylindrical sleeve 96 extending forwardly from the bracket 89 and cut away at 97 on one side to allow the lever 87 to engage the pin. The pin 91 may be rotated manually by means of a knob 98 connected to its front or outer end, this rotation serving to move the pin inwardly or outwardly. Because of the conical shape of the portion 92 which engages the lever 87, this movement will swing the lever about its fulcrum 88 and alter the position of the valve body 74.

It is desirable that the operator be able to adjust the controller in advance for a predetermined fluid pressure, and for this purpose means is preferably provided to indicate on the dial 39 the pressure for which the mechanism is adjusted. As shown particularly in Figs. 2 and 3, the upper end of the lever 87 is connected by means of a link 100 to a sector gear 101 which meshes with a pinion 102 on a hollow horizontal shaft 103 surrounding the shaft 37. The front or outer end of the shaft 103 extends close to the hand 38 and carries an indicating hand 104 which is located between the hand 38 and the dial 39. The link 100 is connected to the sector gear 101 by means of a screw 106 arranged for adjustment along a slot 107 in the gear in order that the hand 104 may correctly indicate the pressure which the controller will maintain when placed in service. This adjustment is made by trial at the time the controller is assembled. The gear 101 is pivotally supported on a horizontal pin 108 coaxial with the pin 43 and carried by a pair of spaced upright plates 109 and 110, these plates also providing bearings for the hollow shaft 103. The plates 109 and 110 are supported and fastened together by the screws 47, which extend through spacer sleeves 111 located between the plates.

The various operative parts of the controller are preferably enclosed to protect them from dust and to improve the appearance of the apparatus. As shown particularly in Fig. 3 a casing or cover plate 115 is secured to the front of the plate 23, this casing having a circular glass window 116 in front of the dial 39. Similar glass windows, smaller in size, may be provided in front of the pressure gauges 58 and 62. The casing 115 may be held in position by means of three screws 117, one of which is threaded into the front end of the post 88 and two of which are threaded into posts 118 extending forwardly from the upper part of the plate 23. The rear portion of the knob 98 extends through the casing 115 and is held against axial movement relative thereto by means of a sleeve 120 which is secured to the knob by a cotter pin 121. This cotter pin passes through a diametrical slot 122 formed in the front portion of the pin 91, which extends into a recess 123 in the rear of the knob. With this construction, after removing the screws 117, the casing 115 and the knob 98 can be withdrawn forwardly without disturbing the pin 91.

The operation of the invention will now be apparent from the above disclosure. Assuming that the system is in equilibrium, there will be a steady flow of fluid in the pipe line 12, and the pressure at the discharge side of the motor valve 11 will be transmitted through the pipe 19 to the Bourdon tube 31. The free end of the Bourdon tube will hold the pin 83 in position to contact with the side of the valve stem 82, thus maintaining the valve disk 80 in a slightly tipped position and out of contact with the seat 76. There will be a steady flow of air from the pipe 20 through the tube 64, the orifice plug 70, the tube 67, the fitting 53 and the tube 73 to the valve body 74, whence the air escapes to atmosphere past the valve 80 and through the port 75. The air pressure transmitted through the pipe 18 to the diaphragm 15 of the motor valve will be sufficient to hold the valve member 14 partially open against the force of the spring 16. The Bourdon tube 31 will function through the link 33, sector gear 34, pinion 35, and shaft 37 to hold the hand 38 in the proper position with respect to the dial 39 to indicate the actual fluid pressure existing in the pipe 19. The hand 104 will be positioned exactly behind the hand 38.

If now the demand for fluid from the pipe 12 should decrease there will be an immediate increase in the pressure transmitted through the pipe 19 to the Bourdon tube, and as a result of the movement of this tube the pilot valve 80 will close slightly, increasing the air presure in the fitting 53 and pipe 18. This will force the motor valve diaphragm 15 downwardly and move the valve member 14 toward closed position, thereby restricting the flow in the pipe 12 to correspond with the decreased demand and preventing more than a slight increase in the pressure at the delivery side of the motor valve. Similarly if the demand for fluid from the pipe 12 should increase there will be an immediate decrease in the pressure transmitted through the pipe 19 to the Bourdon tube. This tube will move in a direction to open the pilot valve 80 slightly, thus decreasing the air pressure on the diaphragm 15, allowing the spring 16 to move the valve member 14 toward open position. This will increase the flow in the pipe 12 to corresponding with the increased demand, and prevent more than a slight decrease in the pressure at the delivery side of the motor valve. The total variation in this delivery pressure required to effect movement of the valve member 14 throughout its whole stroke constitutes the "operating range" of the controller, and this operating range can be adjusted by loosening the screw 86 and moving the valve body 74 upwardly or downwardly relative to the lever 85. Upward movement will increase the operating range by increasing the effective length of the valve stem 82, whereas downward movement will decrease the same.

Throughout the operation of the apparatus the gauge 58 will indicate the pressure of the air supplied by the pipe 20, this pressure being normally held constant by the action of the regulating valve 21. The gauge 62 will indicate the pressure of the air supplied to the diaphragm 15 and hence will indicate the extent of opening of the motor valve 11. If it is desired to vary the pressure at the delivery side of the motor valve, the operator need merely turn the knob 98 on the front of the controller. This will move the pin 91 axially and cause the lever 87 to move about its fulcrum 88, thus changing the position of the pilot valve body 74. The movement of the lever 87 will be communicated through the link 100, the sector gear 101, the pinion 102 and the hollow shaft 103 to the hand 104, which will indicate on the dial 39 the pressure for which the controller is now adjusted. As the pilot valve 80 moves with respect to the pin 83 on the Bourdon tube, the amount of opening of the pilot valve will be varied, changing the pressure transmitted to the motor valve 11 and either opening or closing this valve as the case may be. The resultant change in pressure in the pipe 12 will be transmitted to the Bourdon tube 31, which will reposition the pin 83 relative to the pilot valve and restore all the parts to equilibrium. When this occurs the hand 38 will be located directly in front of the hand 104 in the new position of the latter. Thus the operator can readily adjust the controller in advance for any predetermined pressure, and he can ascertain at any time, by inspection of the hands, how accurately this pressure is being maintained.

In the light of the above disclosure it will be apparent that the invention provides a controller which is simpler, less expensive, more compact, and more reliable than any mechanism heretofore known for the same purpose. The pilot valve is so constructed as to allow free overtravel of the Bourdon tube, and because of the negligible load imposed upon the latter by the pilot valve the accuracy of the pressure indication can be depended upon. The construction of the pilot valve and its associated seat is such that tight closing of the valve is ensured whenever required by operating conditions.

Having thus described my invention, what I claim as new and desire to secure by Letters Patent is:

1. A valve mechanism comprising a valve body having an atmospheric discharge port surrounded at its inner end by an annular valve seat, a valve mounted within the body and arranged to contact with the seat, a stem extending outwardly from the valve through the port, a device movable in response to variations in a fluid pressure, a movable abutment actuated by the device, the abutment being arranged to contact with the valve stem at one side and tip the valve relative to the seat, and means to adjust the position of the valve body in a direction substantially parallel with the valve stem and thereby vary the effective length of the valve stem.

2. A valve mechanism comprising a valve body having an atmospheric discharge port surrounded at its inner end by an annular valve seat, a valve mounted within the body and arranged to contact with the seat, a stem extending outwardly from the valve through the port, a device movable in response to variations in a fluid pressure, a movable abutment actuated by the device, the abutment being arranged to contact with the valve stem at one side and tip the valve relative to the seat, and means to adjust the position of the valve body in a direction transverse to the valve stem.

3. A pilot controller comprising a device movable in response to variations in the pressure of a primary fluid, a hollow valve body arranged to be supplied with an auxiliary fluid and provided with an atmospheric discharge port surrounded at its inner end by an annular valve seat, a valve mounted within the body and arranged to contact with the seat, a stem extending outwardly from the valve through the port, and an abutment movable by the device in a path transverse to the valve stem, the abutment being arranged to contact with the valve stem at one side and tip the valve relative to the seat, the parts being so constructed and arranged that the valve stem can be mounted at either side of the abutment, whereby the rate of discharge of the auxiliary fluid may be controlled either directly or inversely with respect to the changes in the pressure of the primary fluid.

4. A pilot controller comprising a Bourdon tube having one end free to move in response to variations in the pressure of a primary fluid admitted to the interior of the tube, a hollow valve body arranged to be supplied with an auxiliary fluid and provided with an atmospheric discharge port surrounded at its inner end by an annular valve seat, a valve mounted within the body and arranged to contact with the seat, a stem extending outwardly from the valve through the port, and an abutment mounted on the free end of the Bourdon tube and arranged to contact with the valve stem at one side and tip the valve relative to the seat, thereby controlling the rate of discharge of the auxiliary fluid in accordance with variations in the pressure of the primary fluid.

5. A pilot controller comprising a device movable in response to variations in the pressure of a primary fluid, a hollow valve body arranged to be supplied with an auxiliary fluid and shaped to provide a cylindrical recess having an atmospheric discharge port leading coaxially therefrom, the port being surrounded at its inner end by an annular valve seat, a valve shaped substantially as a circular disk cooperating with the seat to control the flow through the port, the valve fitting closely in the recess and the periphery of the valve being cut away on at least one side to allow fluid to flow past the valve to the seat, a stem extending outwardly from the valve through the port, and a movable abutment actuated by the device, the abutment being arranged to contact with the valve stem at one side and tip the valve relative to the seat, thereby controlling the rate of discharge of the auxiliary fluid in accordance with variations in the pressure of the primary fluid.

6. A pilot controller comprising a device movable in response to variations in the pressure of a primary fluid, a hollow valve body arranged to be supplied with an auxiliary fluid and provided with an atmospheric discharge port surrounded at its inner end by an annular valve seat, a valve mounted within the body and arranged to contact with the seat, a stem extending outwardly from the valve through the port, a movable abutment actuated by the device, the abutment being arranged to contact with the valve stem at one side and tip the valve relative to the seat, thereby controlling the rate of discharge of the auxiliary fluid in accordance with variations in the pressure of the primary fluid, and means to adjust the position of the valve body in a direction substantially parallel with the valve stem and thereby vary the effective length of the valve stem.

7. A pilot controller comprising a device movable in response to variations in the pressure of a primary fluid, a hollow valve body arranged to be supplied with an auxiliary fluid and provided with an atmospheric discharge port surrounded at its inner end by an annular valve seat, a valve mounted within the body and arranged to contact with the seat, a stem extending outwardly from the valve through the port, a movable abutment actuated by the device, the abutment being arranged to contact with the valve stem at one side and tip the valve relative to the seat, thereby controlling the rate of discharge of the auxiliary fluid in accordance with variations in the pressure of the primary fluid, and means to adjust the position of the valve body in a direction transverse to the valve stem and thereby vary the amount of opening of the valve corresponding to a given pressure of the primary fluid.

8. A pilot controller comprising a supporting structure, a device mounted thereon and movable in response to variations in the pressure of a primary fluid, a lever fulcrumed on said structure, a hollow valve body mounted on the lever and arranged to be supplied with an auxiliary fluid, the valve body being provided with an atmospheric discharge port, a valve to control the discharge of fluid through the port and connected to the said movable device for actuation thereby, whereby the rate of discharge of the auxiliary fluid will be controlled in accordance with variations in the pressure of the primary fluid, a pin screw-threaded in the supporting structure and provided with a tapered portion, and means to maintain the lever in contact with the tapered portion of the pin, the parts being so constructed and arranged that by rotating the pin it will be moved axially, thereby adjusting the lever about its fulcrum and varying the position of the valve body relative to the said movable device.

PAUL C. TEMPLE.